United States Patent [19]

Mohan et al.

[11] Patent Number: 4,828,088

[45] Date of Patent: May 9, 1989

[54] CLOSED LOOP PULSE MODULATED VISCOUS FAN CONTROL

[75] Inventors: Robert J. Mohan, Madison Heights; Walter K. O'Neil, Birmingham, both of Mich.

[73] Assignee: Eaton Corporation, Cleveland, Ohio

[21] Appl. No.: 51,882

[22] Filed: May 18, 1987

[51] Int. Cl.[4] ...................... F16D 35/00; F16D 43/25
[52] U.S. Cl. ................. 192/58 B; 192/82 T; 192/103 F
[58] Field of Search ............... 192/58 B, 58 R, 82 T, 192/103 F; 123/41.12

[56] References Cited

U.S. PATENT DOCUMENTS

| | | |
|---|---|---|
| 1,410,361 | 3/1922 | Blackmore . |
| 1,433,399 | 10/1922 | Modine . |
| 2,791,100 | 5/1957 | Maurer ........................... 62/4 |
| 2,974,768 | 3/1961 | Hause ........................... 192/82 |
| 3,055,473 | 9/1962 | Oldberg et al. ............... 192/58 |
| 3,207,279 | 9/1965 | Ahlen ........................... 192/57 |
| 3,684,397 | 8/1972 | Elmer ........................... 416/39 |
| 3,809,197 | 5/1974 | Clancey ........................ 192/58 |
| 4,056,178 | 11/1977 | Detty ........................... 192/58 |
| 4,246,995 | 1/1981 | Gee ............................. 192/58 |
| 4,265,348 | 5/1981 | Clarke .......................... 192/58 B |
| 4,270,641 | 6/1981 | Nonnenmann et al. ....... 192/58 B X |
| 4,271,945 | 6/1981 | Budinski ....................... 192/58 B |
| 4,302,156 | 11/1981 | LaFlame ....................... 192/58 B X |
| 4,362,226 | 12/1982 | Gee ............................. 192/58 |
| 4,650,045 | 3/1987 | Weible .......................... 192/0.02 |

FOREIGN PATENT DOCUMENTS

2059021 4/1981 United Kingdom ............ 123/41.12

Primary Examiner—Rodney H. Bonck
Attorney, Agent, or Firm—J. G. Lewis

[57] ABSTRACT

A viscous fan clutch (10) is typically employed in a fan drive mechanism within in a truck or or automobile. A shaft (18), driven by the engine (12), rotates a clutch member (42) within the fan drive. The clutch member is arranged for fluid engagement with a body member (60) for the transmission of torque thereto when fluid is disposed in an operating chamber (100) defined by complementary shear surfaces in the clutch and body members (48 and 98), respectively. A tether assembly (30) operates as an actuator to displace a valving member (158) within the clutch to control the torque transmission therethrough and thus the speed of the output shaft (and fan 34) thereof. Fan speed is regulated as a function of a sensed temperature of the host engine by a control circuit (176) which senses fan speed and coolant fluid temperature and generates a speed error signal as a function of temperature.

7 Claims, 4 Drawing Sheets

CLOSED LOOP PULSE MODULATED VISCOUS FAN CONTROL

INTRODUCTION

The present invention relates to viscous fluid couplings, and more particularly, to such couplings which compensate for various parametric variations in their host systems, such as speed, temperature and the like.

BACKGROUND OF THE INVENTION

It will be apparent from a reading of the specification that the present invention may be advantageously utilized with fluid couplings intended for many different applications. However, the invention is especially useful when applied to a viscous fluid coupling which serves as a drive for the radiator cooling fan of a vehicle engine, and will be described in connection therewith.

Viscous fluid couplings have received wide acceptance in the automobile industry for controlling the amount of torque transmitted to a radiator cooling fan. The most common form of such viscous fluid couplings is the air temperature response type such as illustrated in U.S. Pat. No. 3,055,473. In certain applications, however, it has become desirable to directly sense the water temperature in the radiator rather than the temperature of the air passing through the radiator. To date, many arrangements have been proposed to accomplish this result. These arrangements, however, have made use of wet and dry plate clutches that are electrically actuated. In each of these arrangements, the advantages achieved through the use of viscous fluid have not been applied. Another disadvantage common to a viscous fluid coupling employing centrifugal pumps is "morning sickness" i.e., the tendency of the viscous fluid to migrate backward through the pump into the operating chamber when the engine is shut down, causing annoying high speed operation of the fan when the engine is next started in the cold condition such as in the morning. The problem of high speed operation of the viscous fluid coupling upon cold start has been partially alleviated by the use of high capacity pumps which quickly pump any fluid which has drained back into the operating chamber when the engine is shut off, into a fluid storage chamber. Although this reduced the duration of the "morning sickness", it has not eliminated it. Additionally, a secondary problem caused by the use of high capacity pumps is that in some modes of fan operation, fluid tends to be pumped into the storage chamber more quickly than it can be communicated back into the operating chamber during normal operation of the clutch. This causes an unpredictable response time and in some cases where the input speed is very high relative to the fan speed, the fan drive may not engage at all.

Recent efforts to overcome the above recited disadvantages of prior approaches have often resulted in overcompensating designs which either operate at higher speed than necessary or in an on-off cycling manner, producing undesirable noise, vibration and energy losses as well as being unduly complex and expensive to manufacture.

BRIEF DESCRIPTION OF THE INVENTION

The present invention finds particular application in a viscous fluid clutch of the type including two members which are mounted for relative rotation, each having shear surfaces thereon coacting such that when fluid is circulated therebetween, they enable the transmission of torque between the members. Valving means is provided to modulate the fluid circulation including an element displaceable between first and second positions to control the amount of torque transmission between relatively high and low levels. Actuator means are provided to displace the element between those first and second positions in response to a periodic pulsed actuation signal generated by control means which varies the duration of the pulses as a function of sensed rotational speed of a load driven by the clutch.

In the preferred embodiment of the invention, the clutch is a viscous fluid type including a first clutch member fixed to a shaft for rotation therewith, a second clutch member mounted for rotation on the shaft and having shear surfaces which coact with complementary shear surfaces on the first member to define an operating chamber therebetween, a fluid storage chamber disposed near the operating chamber and a pump which circulates fluid between the chambers. According to the invention, a valving element is provided which modulates the fluid circulation and includes an elongated valve blade located within the fluid storage chamber which is axially displaceable between first and second positions to selectively cover and uncover at least one drain port interconnecting the radially outwardmost portion of the fluid storage chamber with the operating chamber. An actuator is provided to displace the element between the first and second positions in response to a periodic pulsed actuation signal generated by a control circuit which operates to vary the duration of the pulses as a function of sensed rotational speed of the load, such as a vehicle cooling fan. This arrangement ensures that the clutch will drive its load at a precise speed to provide adequate torque transmission, conserve energy and minimize audible noise levels and vibration.

According to another aspect of the invention, the control circuit is further operative to vary the period of the actuation signal as a function of sensed temperature of the host system. This arrangement has the advantage of providing an ideal input-output clutch speed vs. engine speed characteristic for all temperatures.

According to another aspect of the invention, the control circuit generates an error signal as a function of both load speed and sensed temperature and, when said error signal falls below a predetermined level, generates an override signal which maintains the valving element in the second position. This arrangement insures maximum cooling for extremely high temperature conditions and start-up when the input-output speed differential of the clutch is extremely high or whenever the speed error signal exceeds a predetermined value.

According to another aspect of the invention, valve blade control means are provided to maintain the valve blade in an orientation substantially parallel to that it assumes in the first position when the valve blade is in the second position. The arrangement insures the complete opening of all of the drain ports when the valve blade is shifted into the second position and thus, precise operation of the clutch.

According to still another aspect of the invention, the actuator includes at least one leaf spring for biasing the valving element toward the second position, said leaf spring being integrally formed with said valve blade. This arrangement has the advantage of fail-safing the clutch into the engaged position.

Various other features and advantages of this invention will become apparent upon reading the following specification, which, along with the patent drawings, describes and discloses a preferred illustrative embodiment of the invention in detail.

The detailed description of the specific embodiment makes reference to the accompanying drawings.

DETAILED DESCRIPTION OF THE SPECIFIC EMBODIMENT

Figure 1:
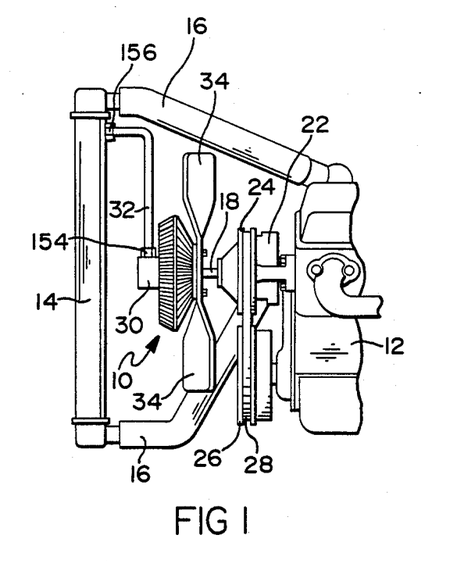
FIG. 1, is a side plan broken view of the preferred embodiment of the invention in its intended environment.

Referring to FIG. 1, the preferred embodiment of a viscous fluid clutch 10 is illustrated in its intended environment with a truck or automobile internal combustion engine 12 and radiator 14. Engine 12 and radiator 14 are interconnected by hoses 16 in the usual manner to provide for the flow of liquid coolant from engine 12 through radiator 14 for return to engine 12. Clutch 10 comprises a driving or input shaft 18 including an integral shaft flange 20 which is mounted to an engine coolant pump 22 for rotation therewith. Input shaft 18 and pump 22 are driven through pulleys 24 and 26 and a V-belt 28 as is well known in the art. A tether assembly 30 is carried for relative rotation on the front (left-hand as viewed in FIG. 1) face of clutch 10 and is grounded to radiator 14 by a rigid conduit 32 as will be described in greater detail hereinbelow. A plurality of fan blades 34 are secured to clutch 10 for rotation therewith.

Figure 2:
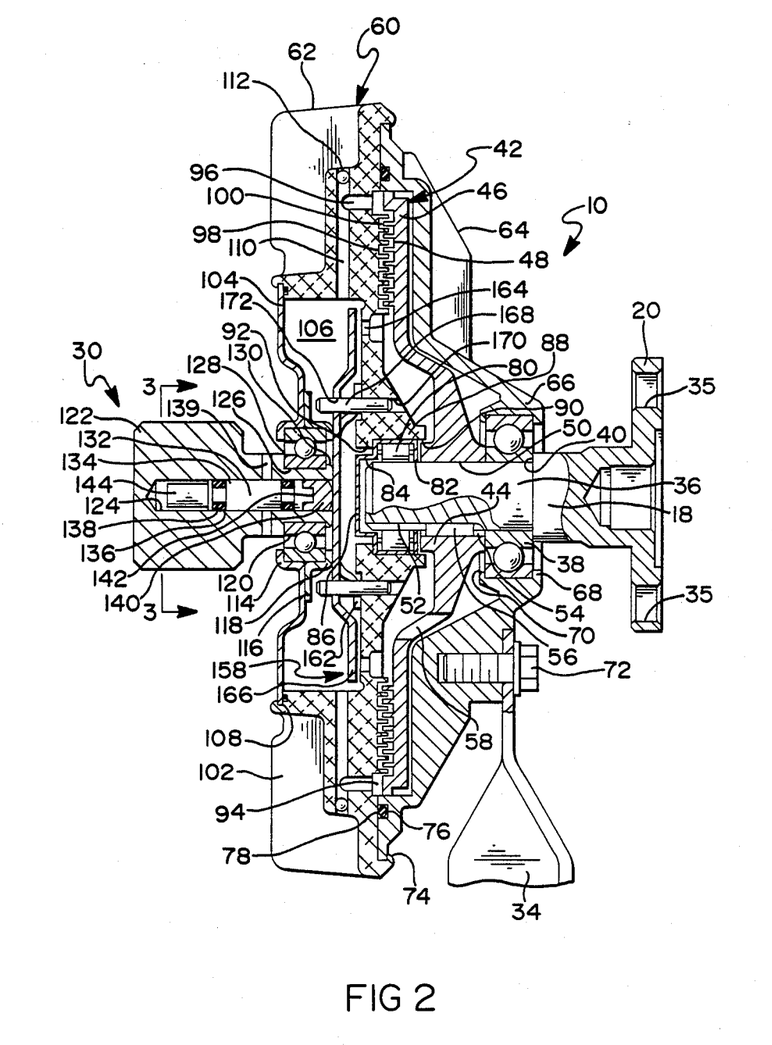
FIG. 2, is a sectional view of the clutch of FIG. 1 on an expanded scale.

Referring to FIG. 2, the internal structure of clutch 10 is shown in detail. Flange 20 defines a number of circumferentially spaced apertures 35 which accommodate bolts (not shown) for mounting clutch 10 to pump 22. Driving shaft 18 is provided with a reduced intermediate portion 36 which functions as an inner race supporting means for a ball bearing assembly 38. A shoulder 40 formed on shaft 18 restrains bearing 38 in one axial direction.

A clutch member 42 is provided with a hub portion 44 and a plate portion 46 having a plurality of concentric annular coupling lands 48 formed on the back side thereof. Hub portion 44 is provided with a straight wall opening 50 which has an interference fit with shaft portion 18 so that clutch member 42 rotates with and is axially retained on shaft 18. Shaft portion 36 and hub 44 each have axially extending slots 52 and 54, respectively, formed therein receiving a key 56 which prevents relative rotation between shaft 18 and clutch member 42. Hub portion 44 is pressed onto shaft portion 36 until it abuts the inner race of bearing 38 to restrain bearing 38 in the other direction of axial movement. Several breathing apertures 58 are formed in clutch member 42 at the point of transition between hub portion 44 and plate portion 46.

A cover assembly 60 comprising a cover member 62 and a body member 64 is mounted for rotation on shaft 18. Body 64 includes a hub 66 which is supported on the lateral surface of the outer race of bearing assembly 38 and is disposed in an interference fit therewith. A shoulder portion 68 of hub 66 reacts against an end surface of the outer race of bearing assembly 38 and limits movement of body 64 in one axial direction. A second shoulder portion 70 also formed in hub 66 of deformed material limits movement of body 64 in the other axial direction. Body 64 and cover 62 are thereby free to rotate about shaft 18 upon bearing assembly 38. Fan blades 34 are secured at the shank portion thereof by bolts 72 at a radially intermediate portion of body 64. Cover 62 is affixed with body 64 by means of a shoulder portion 74 which circumferentially embraces the radially outwardmost edge of body 64. An elastomeric seal 76 resides in an annular channel 78 in the radially outwardmost portion of body 64 which abuts cover 62.

Reduced intermediate portion 36 of shaft 18 extends leftwardly beyond hub 44 of clutch member 42 and receives thereon a roller bearing assembly 80. Bearing assembly 80 includes an outer race 82 which is generally cup-shaped and includes a side wall portion 84 with a radially inwardly opening recessed formed therein for receiving the bearing assembly's rollers, and a bottom portion 86 for enclosing and sealing the end of shaft 18.

Cover 62 has a hub portion 88 and stepped through bore 90 formed therein. Outer race 82 is press-fit within bore 90 and is restrained from axial displacement in one direction by a step 92 formed in bore 90 and in the other axial direction by hub 44 of clutch member 42.

Cover 62 is provided with an annular recess 94 formed in the face thereof on the side adjacent lands 48. A pair of diametrically opposed axially directed holes 96 are disposed slightly radially outwardly of a second set of annular lands 98, which are defined by cover 62. Annular lands 48 and 98 and the adjoining raised portions of body 64 and cover 62 constitute shear surfaces and define an operating 15 chamber 100 therebetween which operates such as described in U.S. Pat. No. 4,056,178, the specification of which is incorporated herein by reference. Annular lands 48 terminate or alternately are cut away in the form of a V-notch to form three equally spaced radially directed channels. The structure defines a known fluid path commencing with the area adjacent lands 48 and 98, the radial channels, axially directed holes 96 and annular recess 94.

Cooling fins 102 are integrally formed in cover 62 adjacent fan blades 34. Cooling fins 102 are arranged to provide additional cooling area to dissipate heat which is generated in clutch 10.

A reservoir cover plate 104 cooperates with cover 62 to define an annular fluid storage chamber 106. Cover plate 104 is received in an annular notched recess 108 provided in cover 62 to laterally confine cover plate 104. The material of cover 62 is deformed to retain and seal plate 104 in notched recess 108.

Two diametrically opposed radially directed return passage apertures 110 are defined by cover 62 and interconnect holes 96 with fluid storage chamber 106. The radially outwardmost end of return passage apertures 110 are sealed with an interference fit ball 112 or other suitable material.

Reservoir cover plate 104 is generally annular in shape and has an outwardly (leftwardly as viewed in FIG. 2) extending step portion 114 at the radially inwardmost extent thereof. A generally annular retainer ring 116, having an inwardly (rightwardly) extending step portion 118 complementary to step portion 114 of cover plate 104 is affixed thereto such as by welding or other suitable means. Step portions 114 and 118 coact to define a radially inwardly opening recess within which is received the outer race of a ball bearing assembly 120.

Figure 3:
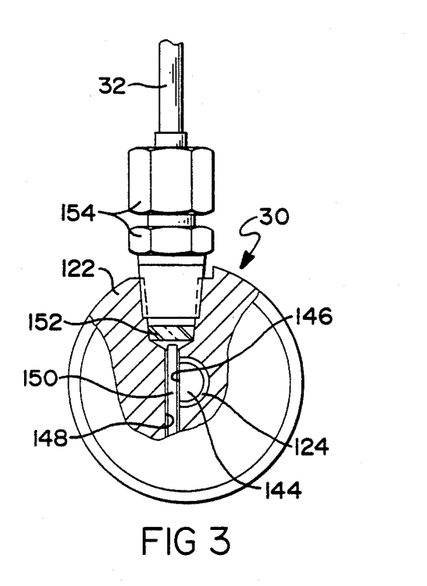
FIG. 3, is a broken sectional view taken on lines III—III of FIG. 2 on an expanded scale.

Referring to FIGS. 2 and 3, tether assembly 30 includes a cylindrical housing 122 with an inwardly opening axial blind bore 124. The inwardmost part of housing 122 has a portion of reduced diameter 126, the outer portion of which is press-fit within the inner race of bearing assembly 120. Reduced diameter portion 126 of housing 122 has a step 128 formed therein abutting one lateral edge of the inner race of bearing assembly 120, thereby restraining tether assembly 30 in one axial direction. The outer surface material of the innermost end of reduced diameter portion 126 of housing 122 is deformed radially outwardly 130 to embrace the other lateral surface of the inner race of bearing assembly 120 and thereby restrain tether assembly 30 in the other axial direction. Thus, tether assembly 30 is carried by cover assembly 60 but has complete rotational freedom with respect thereto.

A piston assembly 132 is slidingly received within bore 124. Assembly 132 has a central portion 134 dimensioned closely with bore 124 to effect a sliding sealing relationship therebetween. Two spaced radially outwardly opening recesses 136 are formed astride central portion 134 of piston assembly 132 and have O-rings 138 or other suitable sealing means received therein. Radially extending vent apertures 139 formed in housing 122 continuously communicate the volume axially intermediate O-rings 138 and radially intermediate control portion 134 and bore 124 with the atmosphere to prevent pressurized fluid from passing into fluid storage chamber 106. The inwardmost end of piston assembly 132 comprises a button bearing 140 formed of plastic or other suitable material keyed to the remainder of assembly 132 by a diametrically extending press-fit key and recess shown generally at 42. Thus configured, bearing 140 is restrained for movement with the balance of piston assembly 132.

The outwardmost end of piston assembly 132 has a reduced diameter portion 144 having an axially extending flat 146 formed thereon. An axially extending blind bore 148 partially intersects with blind bore 124. A retaining pin 150 is loosely disposed within bore 148 and abuts flat 146, thus preventing rotation of piston assembly 132 with respect to housing 122. At the point it emerges from housing 122, blind bore 148 has a stepped increase diameter to receive a porous filter 152 and a fitting assembly 154. Fitting 154 serves to fluidly interconnect conduit 32 with blind bore 148. The other end of conduit 32 is affixed by appropriate fittings 156 to a rigid portion of the vehicle chassis as illustrated in FIG. 1. It is contemplated that conduit 32 could be extremely thick wall type tubing to provide sufficient structural integrity to serve as a tether for the remainder of assembly 30. Alternatively, an additional structural member could be provided such as that described in U.S. Pat. No. 4,246,995, the specification of which is incorporated herein by reference. It should be understood that tether assembly 30 can be grounded to any suitable stationary chassis portion of the host vehicle and that the arrangement illustrated in FIG. 1 is by way of example only. Furthermore, as will be seen and described in detail hereinbelow, conduit 32 is not in fluid communication with the coolant system associated with engine 12.

Figure 4:
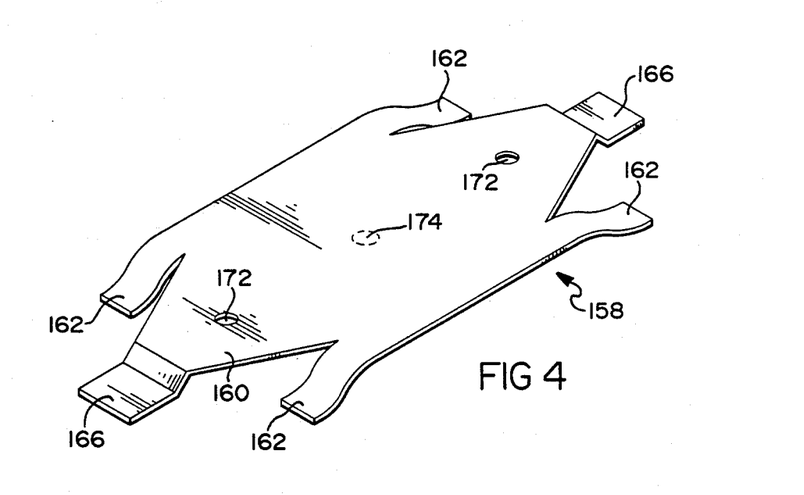
FIG. 4, is a perspective view of the valving element employed in the preferred embodiment of the invention.

Referring to FIGS. 2 and 4, a valving element 158 comprises an elongated valve blade portion 160 and four leaf spring extension portions 162 depending therefrom. Valving element 158 is disposed within fluid storage chamber 106 with the four leaf spring extension portions 162 abutting cover 62 and tending to bias valving element 158 leftwardly into the position as illustrated in FIG. 2 whereby under the influence of the pumping action of clutch 10, viscous fluid will pass through hole 96, radially inwardly along return passage aperture 110 and into fluid storage chamber 106.

When actuated, valving element 158 is displaced to the right of its position illustrated in FIG. 2.

Two opposed apertures 164 are formed in cover 62 to communicate the radially outwardmost portion of fluid storage chamber 106 with operating chamber 100. Valving element 158 has opposed offset leg portions 166 positioned in axial alignment with apertures 164 to overlay and close same when valve blade portion 160 is displaced fully to the right from its illustrated position to a second position in which the right-handmost surface of offset leg portions 166 abut the left-hand surface area of cover 62 surrounding apertures 164. Valving element 158 is constructed of material thick enough to prevent lost motion when biased into the second position or, alternatively, is stiffened by the use of ribs running along the line of elongation of valve blade portion 160. Valving element 158 is retained radially in its illustrated position by pins 168 press-fit within axially extending bores 170 within hub 88 of cover 62, said pins extending freely through registering holes 172 in valving element 158.

The right-handmost surface of button bearing 140 is rounded and abuts the central portion of valve blade portion 160 at a location illustrated in phantom at 174 in FIG. 4.

In operation, conduit 32 is fluidly connected to a regulated source of fluid pressure through an electrically controlled valve. Specifically, the present invention is contemplated for use in heavy duty trucks wherein the brake pressure reservoir would be used as the source as will be described in detail hereinbelow. Referring again to FIGS. 2 and 3, when there is no air pressure applied to clutch 10 via conduit 32, valving element 158 will assume the position illustrated in FIG. 2 by virtue of the leftward biasing effect of leaf springs 162 which, in turn, will displace piston assembly 132 leftwardly to the position illustrated. In operation, both cover assembly 60 and clutch member 42 of clutch 10 are rotating relative to tether assembly 30. The right-handmost portion of bearing 140 will maintain rotating point contact with location 174 of valving element 158 at all times.

When fluid or air within conduit 32 is pressurized to a suitable level, the air will pass through blind bores 148 and 124 and act upon the left-handmost surface area of piston assembly 132 urging it toward the right as illustrated in FIG. 2. Given sufficient pressure, piston assembly 132 will displace valving element 158 rightwardly from its illustrated position until offset leg portions 166 abut the left face of cover member 62 thereby closing off apertures 164 and preventing fluid communication between fluid storage chamber 106 and operating chamber 100.

When fluid pressure in conduit 32 is reduced, the biasing effect or leaf springs 162 will again return valve blade portion 160 or valving element 158 and piston assembly 132 to their respective illustrated positions.

In operation, the pumping action caused by the sweeping of the radially outwardmost portion of clutch member 42 by annular recess 94 causes a localized region of increased pressure within the operating chamber 100. This pumping arrangement is well known in the art and is described in detail in U.S. Pat. No. 3,809,197, the specification of which is incorporated herein by reference. The increased pressure causes the viscous fluid in the operating chamber 100 to pass through holes 96 and into return passage aperture 110. The fluid will then pump radially inwardly through return passage apertures 110 and into fluid storage chamber 106. If conduit 32 is pressurized and apertures 164 are closed, within a relatively short time virtually all of the fluid will be pumped into the return passage 110 and fluid storage chamber 106 causing clutch member 42 and shaft 18 to rotatably slip with respect to cover assembly 60 and fan blades 34. Thus, when the engine is cold, the blades will turn relatively slowly. With the blades turning relatively slowly, the engine temperature, lacking the supplementary cooling action of the fan, will increase toward operating temperature more rapidly than otherwise would be the case.

As will be described in detail hereinbelow, when normal operating conditions are achieved, fluid pressure within conduit 32 will be modulated to successively open and close apertures 164 to efficiently control the rotating speed of fan blades 34 at an optimum speed. Whenever valving element 158 is in its position illustrated in FIG. 2, fluid stored in storage chamber 106 will be free to flow through aperture 164 into operating chamber 100 thereby causing the clutch to engage and increasing the relative rate at which the fan 34 is turning. As fluid works itself radially outwardly through operating chamber 100, it is in turn pumped through holes 96 and radially inwardly through return passage aperture 110 back to fluid storage chamber 106 as described hereinabove.

Figure 5:
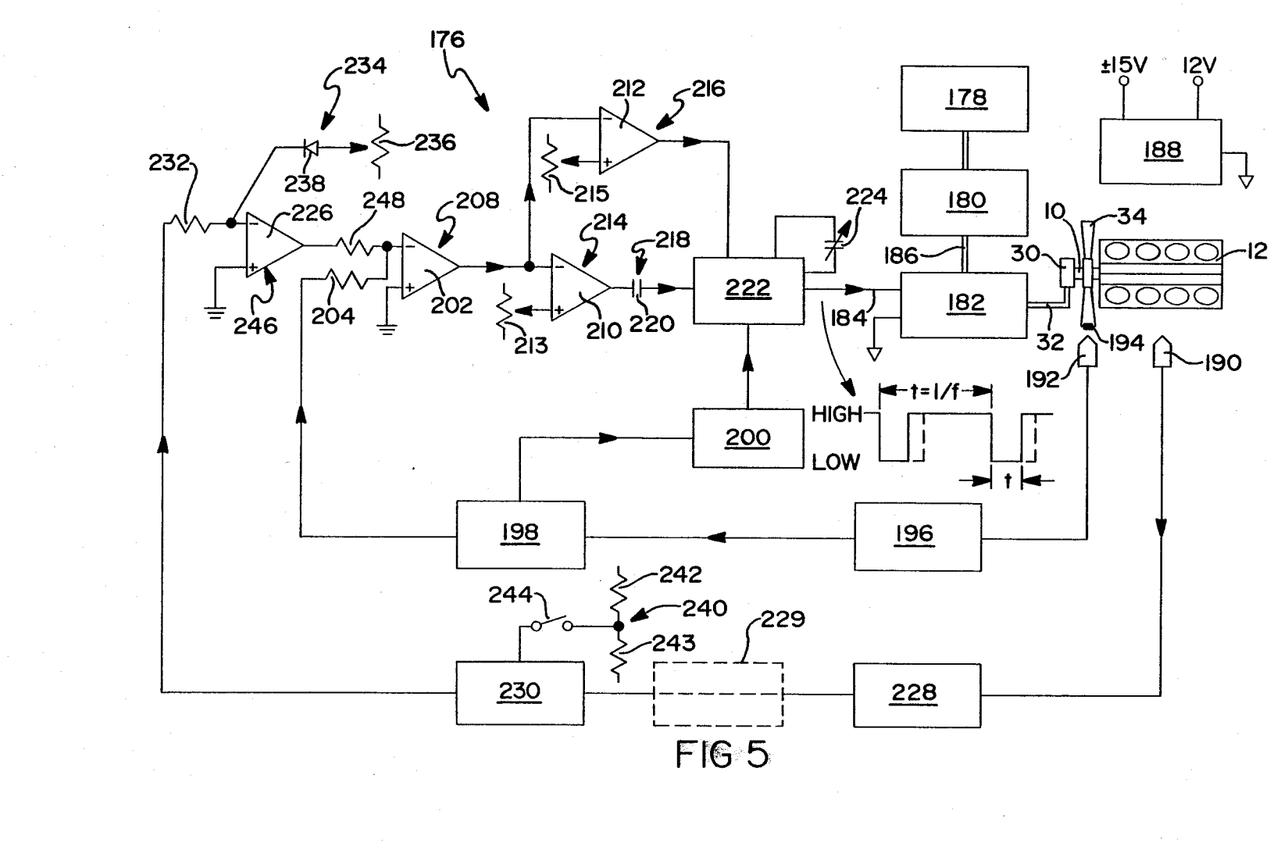
FIG. 5, is a block diagram of the control circuit of the preferred embodiment of the invention.

Turning now to the control system accompanying clutch 10, FIG. 5 illustrates, in block diagram form, a circuit 176 for controlling the operation of clutch 10.

Clutch 10 is interconnected to a source of fluid pressure 178 through a pressure regulator 180 and a solenoid valve 182. Solenoid valve 182 is electrically connected to receive an actuation signal from control circuit 176 through line 184. As will be described in detail hereinbelow, whenever solenoid 182 receives a signal on line 184, it provides regulated fluid pressure from a conduit 186 to clutch 10 via conduit 32. When the control signal on line 184 is off, fluid communication between conduits 186 and 32 is interrupted.

In one contemplated application, the present invention is employed in heavy duty trucks of the type employing air brake systems. In such case the vehicle's brake air reservoir would serve as the fluid pressure source. Pneumatic regulators and solenoid valves 180 and 182, respectively, are readily commercially available and the details thereof will not be elaborated upon here for the sake of brevity.

Control circuit 176 is energized by a power supply 188 and receives its inputs from a linear temperature sender 190, an induction proximity sensor 192 and several set point control circuits internal to circuit 176.

Temperature sender 190 is of the type manufactured by Cole Hersee, Model 84214 and is located either in the water jacket of IC engine 12, radiator 14 or other suitable location in the host engine cooling system. Induction proximity sensor 192 is preferably of the permanent magnet type located on the plane of rotation of fan blades 34 by any suitable structural means (not shown). If necessary, a metallic flag 194 can be employed on the outermost tip of one or more blades 34 to enhance detection sensitivity.

Temperature sensor 190 and proximity sensor 192 provide host engine temperature and fan speed input signals to control circuit 176 which serves to control the operating speed of fan 34. Sensor 192 provides a speed signal to an F/V converter 196 which, in turn, provides a voltage output signal representative of the fan speed to a fan speed loop stabilization circuit 198 and to an actuation signal pulsewidth control circuit 200. Stabilization circuit 198 outputs a fan speed feedback signal to the − input of an operational amplifier (op amp) 202 through a resistor 204. The output terminal of op amp 202 provides a speed error signal to the balance of control circuit 176. Op amp 202 and its associated componentry thus serves as a closed loop fan speed regulator circuit 208. The speed error signal is fed to the negative inputs of comparator op amps 210 and 212, the positive inputs of which are provided as manually adjustable set points via potentiometers 213 and 215, respectively. Op amp 210 and its associated circuitry comprise an inner loop switching regulator circuit 214 and op amp 212 and its associated componentry constitutes a start-up circuit 216. Switching regulator circuit 214 outputs a speed error signal to an edge trigger circuit 218, illustrated in FIG. 5 as a series capacitor 220 which, in turn, provides a switched control input signal to a driver stage circuit 222, varying the period. The outputs of minimum pulsewidth adjustment circuit 200 and start up circuit 216 are also connected to driver stage circuit 222, the output of which is connected to solenoid valve 182 via line 184. Furthermore, adjustable means such as variable capacitor 224 is in circuit with driver stage 222 to provide manual calibration set point adjustment of the pulsewidth of actuation signals on line 184. As will be described in detail hereinbelow, the actuation signal output by driver stage 222 produces a periodic signal of variable pulsewidth and variable period.

Temperature sensor 190 outputs a temperature signal to the − input of an op amp 226 through a series connected temperature sender amplifier circuit 228, temperature loop stabilization circuit 230 and a resistor 232. A minimum speed set circuit 234, comprising a potentiometer 236 and forward biased diode 238 is connected to the negative input of op amp 226. Furthermore, a range set circuit 240, including resistors 242 and 243 and a switch 244 are in circuit with stabilization circuit 230. Op amp 226 and its associated componentry operate as a temperature regulator indicated generally at 246. The temperature error output of op amp 226 is interconnected to the − input of op amp 202 through a resistor 248 to serve as a speed demand for the inner speed regulator loop.

With reference to FIGS. 2 and 5, during normal operation, control fluid pressure is applied to tether assembly 30 which, in turn, displaces valving element 158 axially to the right to close apertures 164. Thus, with solenoid valve 182 energized, solenoid valve 182 is pulsed off for a time duration T which, in one test conducted by the applicants, was approximately one half second, to permit fluid to pass through apertures 164 and enter operating chamber 100, causing an increment of fan speed increase to occur. The best or optimum time for T is adjusted with speed, typically in the range of 0.7 seconds at low speed to 0.4 seconds at high fan speed.

The repetition rate or period (designated t) at which the pulse T occurs is determined by an inner self-oscillating electronic speed regulator loop. Proximity sensor 192 counts the blade rotational frequency and outputs a signal which is converted to an analog DC signal by F/V converter 196, creating a speed error signal at regulator op amp 202 output which switches comparator op amp 210 automatically at a frequency f that demands the set inner loop fan speed (f=1/t). This speed is held constant within an allowable error determined by the loop gain, for changes in engine input speed, air pressure supply, ambient temperature and the like. Start-up circuit 216 ensures reliable starting by holding solenoid valve 182 low until the error is in the control range.

The outer engine coolant temperature control loop then effects an optimized error signal which serves as a demand for the speed loop, insuring that the drive runs at an optimum output speed as a function of coolant temperature.

The resistance change of temperature sensor 190 is converted to a voltage change and amplified in amplifier circuit 228 which is of the instrumentation type. An optional hysteresis stage 229 could be added at this point if desired to ensure that fan speed does not cycle for small coolant temperature changes. Following stabilization circuit 230, an error signal is created at the output of temperature regulator op amp 226 which has the optimum gain and set point to provide the desired speed control. Thus, if sensed coolant temperature is below a set point temperature $T_1$, the fan speed will stay at a minimum value. Above $T_1$ up to a higher set point temperature $T_2$, fan speed will increase to a maximum value with increasing temperature. At steady state temperatures between $T_1$ and $T_2$, fan speed will assume an intermediate rate.

Figure 6:
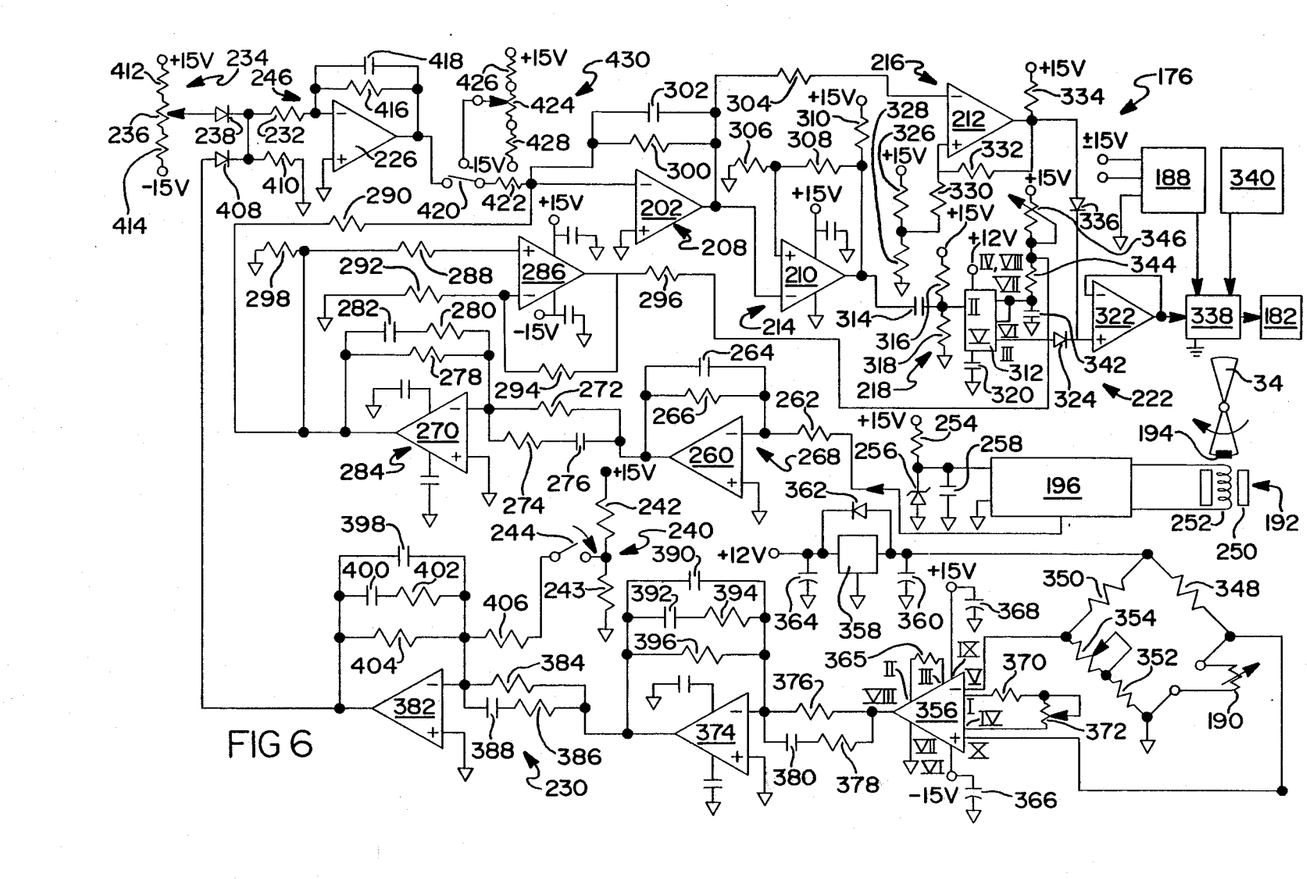
FIG. 6, is a detailed schematic diagram of the control circuit of FIG. 5.

Referring to FIG. 6, a detailed schematic diagram of control circuit 176 is given. The following detailed description relates to a particular circuit that the applicants found to perform according to the presently claimed invention and the details thereof are not deemed to be limiting.

Proximity sensor 192 includes an annular permanent magnet 250 concentrically disposed with a coil 252 electrically connected to the inputs of F/V converter 196 which is of the type manufactured by Microswitch Model TA12-01000. Converter 196 is powered from the point of common connection between a 150 ohm resistor 254 and a type 1N4742AZ diode 256 tied between the +15 VDC power supply and ground. The point of common connection between resistor 254 and diode 256 is also connected to ground through a 0.1 microfarad filter capacitor 258.

The signal output terminal of F/V converter is interconnected with a − input of an op amp to 260 through a 1.3 M resistor 262. The + input of op amp 260 is tied to ground and the negative input is interconnected with its output through a parallel combination of a 0.0068 microfarad capacitor 264 and a 5.1 M resistor 266. Op amp 260 and its associated components constitute a gain circuit shown generally at 268 providing signal noise reduction.

The output of amplifier 260 is interconnected with the − input of op amp 270 through a parallel combination of a 1.3 M resistor 272 and a series connected 120K resistor 274 and 1.0 microfarad capacitor 276. The + input of op amp 270 is connected to ground and the − input is interconnected with the output thereof by a parallel combination of a 1.35 M resistor 278 and series connected 150K resistor 280 and 0.0047 microfarad capacitor 282. Amplifier 270 and its associated components comprises a lead circuit shown generally at 284 which, combined with gain circuit 268 correlate with speed loop stabilization circuit 198 of FIG. 5.

The output of op amp 270 is interconnected with the + input terminal of an op amp 286 through a 10K resistor 288 and interconnected with the − input terminal of op amp 202 through a 5.1K resistor 290. The − terminal of op amp 286 is connected to ground through a 10K resistor 292 and to the output thereof through a 5K resistor 294. The output of op amp 286 is also interconnected with driver stage circuit 222 through a 200K resistor 296 as will be hereinafter described. Op amp 286 and its associated componentry correlate with actuation signal pulsewidth control circuit 200 described in FIG. 5. The output of op amp 270 is connected to ground through a resistor 298.

The + input terminal of op amp 202 is connected to ground. The − input terminal of op amp 202 is interconnected to its output through a parallel combination of a 10K resistor 300 and a 0.047 microfarad capacitor 302. The output of op amp 202 is connected to the − input of comparator 210 and interconnected with the − input of comparator 212 through a series 30K resistor 304. The + terminal of comparator 210 is interconnected to ground through a 30K resistor 306 and to the +15 V power supply through a series combination of a 1 M resistor 308 and a 2K resistor 310. The output of comparator 210 is connected to the point of common connection between resistors 308 and 310 and interconnected with terminal II of a type 555 timer circuit 312 through a 330 picofarad capacitor 314. Terminal II of timing circuit 312 is interconnected with the +15 V power supply through a 4.7K resistor 316 and to ground through a 10K resistor 318. Comparator 210 and its associated components comprise the interloop compensation circuit 14 of FIG. 5 and capacitor 314 and resistors 316 and 18 collectively comprise the edge trigger circuit 218 of FIG. 5. Terminals IV and VIII of 555 timer circuit 312 are connected to the +12 V power supply, and terminal V is interconnected with ground through a 0.01 microfarad capacitor 320. Output terminal III of timer circuit 312 is interconnected with the + input terminal of an op amp 322 through a forward biased type 1N4448 diode 324.

The +terminal of comparator 212 is interconnected to the point of common connection between a 12K resistor 326 and 2.7K resistor 328 which are tied between the +15 V power supply and ground through a 33K resistor 330. The + input terminal of comparator 212 is interconnected with its output terminal through a 1 M resistor 332. The output of comparator 212 is interconnected with the +15 V power supply through a 2K resistor 334 and interconnected to the +input terminal of op amp 322 through a forward biased type 1N448 diode 336. Comparator 212 and its associated components correlate with start-up circuit 216 of FIG. 5.

The − input terminal of op amp 322 is directly connected to its output terminal and to the input of a solenoid driver circuit 338 which also receives appropriate inputs from power supply 188 and a vehicle battery 340 in vehicular applications. The output of solenoid driver circuit is connected to solenoid valve 182 for operation as described hereinabove. Timer circuit 312, op amp 322 and solenoid drive 338, including their respective componentry, correlate with driver stage circuit 222 of FIG. 5. Terminals VI and VII of timer circuit 312 are connected to ground through a common 0.47 microfarad capacitor 342 and to the +15 V power supply through a series combination of a 51.51K resistor 344 and the fixed resistance portion of a 1 meg potentiometer 346. The output of op amp 286 is connected to the point of common connection between resistors 344 and potentiometer 346. The wiper of potentiometer 346 is directly connected to the point of common connection between resistor 344 and potentiometer 346.

Temperature sender 190 constitutes one leg of a bridge circuit including a 301 ohm resistor 348, forming a second leg of the bridge, another 301 ohm resistor 350 forming a third leg of the bridge and a series combination of a 301 ohm resistor 352 and the fixed resistance portion of a 100 ohm potentiometer 354 comprising the fourth leg of the bridge. The wiper of potentiometer 354 is connected to the point of common connection between resistor 352 and potentiometer 354. The corner of the bridge common to resistor 352 and temperature sensor 190 is connected to ground. The corner of the bridge common to resistor 348 and temperature sensor 190 is connected to the + input X of an amplifier 356 of the type manufactured by Burr Brown model INA-101. The point of common connection between resistors 348 and 350 is connected to the output terminal of a type 7805 regulator 358. The output of regulator 358 is connected to ground through a 0.01 microfarad capacitor 360 an to the input terminal of regulator 358 through a reverse biased diode 362. The input of regulator 358 is also connected to ground through a 0.33 microfarad capacitor 364 and to the +12 V power supply. The point of common connection between resistor 350 and potentiometer 354 is connected to the + input terminal V of amplifier 356. Terminals II and III of amplifier 356 are bridged by a 100K resistor 365. Terminal VII of amplifier 356 is connected to ground. Terminal VI of amplifier 356 is connected to the −15 V power supply and interconnected to ground through a 1.0 microfarad capacitor 366. Terminal IX of amplifier 356 is connected to the +15 V power supply and interconnected to ground through a 1.0 microfarad capacitor 368. Finally, terminals I and IV of amplifier 356 are bridged by a series combination of a 5.49K resistor 370 and the fixed resistance portion of a 240 ohm potentiometer 372. The point of common connection between resistor 370 and potentiometer 372 is connected to the wiper of potentiometer 372. The above described bridge, regulator 358, amplifier 356 and their respective associated components correlate with the temperature sender amplifier circuit 228 of FIG. 5.

Output terminal VIII of amplifier 356 is interconnected with the − input terminal of an op amp 374 through the parallel combination of a 1 meg resistor 376 and a series connected resistor 378 and capacitor 380. The + input terminal of op amp 374 is connected to ground. The output terminal of op amp 374 is interconnected with the − input of another op amp 382 through a parallel combination 1 meg resistor 384 and series connected resistor 386 and capacitor 388. The − input terminal of op amp 374 is interconnected with its output through a parallel combination of a capacitor 390, series combined capacitor 392 and resistor 394, and a 1 meg resistor 396. Likewise, op amp 382 has its − input terminal and output terminal series capacitor 400 and resistor 402, and a 1 meg resistor 404. Op amps 374 and 382, along with their respective associated componentry correspond with temperature loop stabilization circuit 230 of FIG. 5. Resistors 242 and 243 and switch 244 are interconnected with the − input terminal of op amp 382 through a 1 meg resistor 406 and correspond with the range set circuit to 240 described hereinabove with reference to FIG. 5.

The output of op amp 382 is interconnected with the − input of op amp 226 through a series combination of a forward biased diode 408 and resistor 232. The point of common connection between diode 408 and resistor 232 is interconnected to ground through a 5.1K resistor 410 and to the cathode of diode 238. Potentiometer 236 is staggered in series connection with resistors 412 and 414 interconnecting the +15 V power supply and the −15 V power supply. Resistors 412 and 414, potentiometer 236 and diode 238 comprise the minimum speed set circuit 234 described in connection with FIG. 5.

The + input terminal of op amp 226 is connected to ground and the output thereof is interconnected with the − input through a parallel combination of a 10K resistor 416 and capacitor 418. Op amp 226 and its associated components relate to the temperature regulator 246 of FIG. 5.

The output of op amp 226 is interconnected with − input of op amp 202 through a series combination of a manual-automatic mode switch 420 and a 5.1K resistor 422. Switch 420 is of the single pole double throw type, having its manual terminal connected to the wiper of a 1K potentiometer 424. The fixed resistance portion of potentiometer 424 is series connected with two 499 ohm resistors 426 and 428, respectively between the +15 and −15 V power supplies. Switch 420, resistors 426 and 428 and potentiometer 424 comprise a manual speed control circuit indicated generally at 430.

It is to be understood that the invention has been described with reference to a specific embodiment which provides the features and advantages previously described, and that such specific embodiment is susceptible of modification, as will be apparent to those skilled in the art. Accordingly, the foregoing is not to be construed in a limiting sense.

What is claimed is:

1. A viscous fluid clutch for transmitting torque from a host system to a load, said clutch comprising:
   a first member secured for rotation with a shaft;
   a second member rotatably disposed on said shaft relative to said first member;
   shear surfaces disposed on said first and second members and forming an operating chamber therebetween;
   a fluid storage chamber adjacent said operating chamber;
   pump means operative to circulate fluid between said operating chamber and fluid storage chamber;
   a valving element operable to modulate said fluid circulation and including a valve blade disposed within said fluid storage chamber displaceable between a first position in which said blade overlays at least one drain port interconnecting the radially outwardmost portion of said fluid storage chamber with said operating chamber, and a second position in which said blade uncovers said drain port, thereby permitting fluid communication between said fluid storage chamber and said operating chamber;

actuator means operative to displace said valving element between said first and second positions in response to a periodic pulsed actuation signal; and control means operative to generate said actuation signal and vary the duration of said pulses as a function of sensed rotational speed of said load, said control means further operative to generate an error signal as a function of sensed temperature in said host system and load speed and to generate an actuator override signal to maintain said valving element in said second position whenever said error signal falls below a predetermined level.

2. The viscous fluid clutch of claim 1, wherein said actuator means comprises a solenoid operative to axially displace said valving element from said second position to said first position in response to said actuation signal.

3. The viscous fluid clutch of claim 2, wherein said actuator further comprises means biasing said valving element toward said second position.

4. The viscous fluid clutch of claim 3, wherein said biasing means comprises at least one leaf spring integrally formed with said valving element.

5. The viscous fluid clutch of claim 1, wherein said load comprises a heat engine cooling fan.

6. The viscous fluid clutch of claim 1, wherein said host system comprises a heat engine including a fluid coolant system.

7. The viscous fluid clutch of claim 1, further comprising valve blade control means operative to maintain said valve blade in an orientation substantially parallel that assumed in said first position when said valve blade is in said second position.

* * * * *